(12) United States Patent
Nagaraju et al.

(10) Patent No.: US 12,349,193 B2
(45) Date of Patent: Jul. 1, 2025

(54) METHOD AND APPARATUS FOR IDENTIFYING LOCATION INFORMATION WITH AUTOMATIC FREQUENCY CONTROL

(71) Applicant: Netgear, Inc., San Jose, CA (US)

(72) Inventors: ManjunathaHarsha Nagaraju, San Jose, CA (US); Ranga Raju Bhupathi Raju, Bengaluru (IN)

(73) Assignee: Netgear, Inc., San Jose, CA (US)

( * ) Notice: Subject to any disclaimer, the term of this patent is extended or adjusted under 35 U.S.C. 154(b) by 685 days.

(21) Appl. No.: 17/697,980

(22) Filed: Mar. 18, 2022

(65) Prior Publication Data

US 2023/0300884 A1    Sep. 21, 2023

(51) Int. Cl.
  *H04W 74/0816* (2024.01)
  *H04W 4/029* (2018.01)
  *H04W 48/14* (2009.01)
  *H04W 48/16* (2009.01)

(52) U.S. Cl.
  CPC ....... *H04W 74/0816* (2013.01); *H04W 4/029* (2018.02); *H04W 48/14* (2013.01); *H04W 48/16* (2013.01)

(58) Field of Classification Search
  CPC ... H04W 74/0816; H04W 4/02; H04W 4/021; H04W 4/029; H04W 48/00; H04W 48/02; H04W 48/04; H04W 48/08; H04W 48/14; H04W 48/16
  See application file for complete search history.

(56) References Cited

U.S. PATENT DOCUMENTS

| | | | |
|---|---|---|---|
| 8,913,959 B1* | 12/2014 | Pochop, Jr. | H04W 24/02 455/41.2 |
| 9,794,966 B2* | 10/2017 | Xing | H04W 8/26 |
| 10,536,921 B1* | 1/2020 | Govindassamy | H04W 64/003 |
| 2005/0197136 A1* | 9/2005 | Friday | H04W 64/00 455/456.1 |
| 2007/0112948 A1* | 5/2007 | Uhlik | H04L 12/1446 709/223 |
| 2008/0039096 A1* | 2/2008 | Forsberg | H04W 12/122 455/438 |

(Continued)

FOREIGN PATENT DOCUMENTS

| | | | | |
|---|---|---|---|---|
| WO | WO-2015058781 A1 * | 4/2015 | | H04L 41/0893 |
| WO | WO-2016126847 A1 * | 8/2016 | | G01C 5/06 |

*Primary Examiner* — Kevin D Mew
(74) *Attorney, Agent, or Firm* — Boyle Fredrickson, S.C.

(57) ABSTRACT

An unlicensed access point is configured to identify its location and to determine licensed 6 GHz users near that location. The access point periodically generates a beacon frame including a request for location information. Client devices within range of the beacon frame provide their location information to the access point. The access point access point uses the location information gathered from client devices to determine its own location. The access point communicates with a central database containing information on registered licenses within the 6 GHz communication band at the location determined from the client devices. The access point then selects a communication channel within the 6 GHz band that does not conflict with any licensed users in the area, and provides Wi-Fi communication over the selected channel.

18 Claims, 6 Drawing Sheets

(56) References Cited

U.S. PATENT DOCUMENTS

| | | | | |
|---|---|---|---|---|
| 2008/0214213 | A1* | 9/2008 | Etemad | H04W 12/02 |
| | | | | 455/456.6 |
| 2010/0290389 | A1* | 11/2010 | Hou | H04W 48/12 |
| | | | | 370/328 |
| 2011/0250903 | A1* | 10/2011 | Huang | H04W 24/00 |
| | | | | 455/456.1 |
| 2012/0276920 | A1* | 11/2012 | Mangold | H04W 12/02 |
| | | | | 455/456.1 |
| 2014/0316841 | A1* | 10/2014 | Kilby | G06F 8/38 |
| | | | | 705/7.26 |
| 2014/0323154 | A1* | 10/2014 | Abraham | G01S 5/0236 |
| | | | | 455/456.2 |
| 2015/0186506 | A1* | 7/2015 | Vandevoorde | G01S 5/0284 |
| | | | | 707/737 |
| 2015/0219742 | A1* | 8/2015 | Castagnoli | G01S 5/0081 |
| | | | | 370/336 |
| 2015/0271779 | A1* | 9/2015 | Alavudin | H04W 48/16 |
| | | | | 455/456.1 |
| 2017/0245115 | A1* | 8/2017 | Lei | H04W 4/90 |
| 2019/0159162 | A1* | 5/2019 | Hassan | G01S 5/0242 |
| 2020/0019580 | A1* | 1/2020 | Kim | G06F 16/9537 |

* cited by examiner

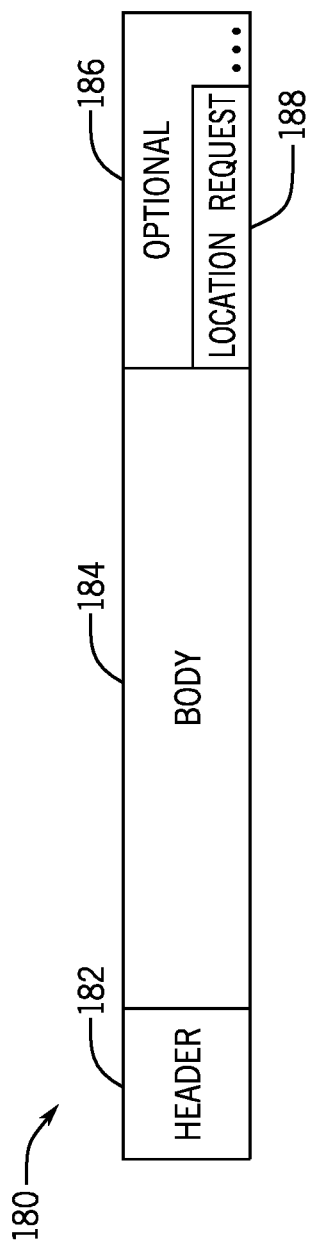

METHOD AND APPARATUS FOR IDENTIFYING LOCATION INFORMATION WITH AUTOMATIC FREQUENCY CONTROL

BACKGROUND OF THE INVENTION

1. Field of the Invention

The present invention relates to Automatic Frequency Control, and, more particularly, to a system and method for identifying location information for an Access Point configured to communicate via unlicensed Wi-Fi in the 6 Gigahertz (6 GHz) band.

2. Discussion of the Related Art

Wi-Fi communications refers to a family of wireless communication protocols based on the Institute of Electrical and Electronics Engineers (IEEE) 802.11 standards. The IEEE 802.11 standards have previously defined radio frequency spectrums in a 2.4 GHz band or in a 5 GHz band for use by unlicensed communications. Multiple channels exist in each band. Any device configured to communicate via Wi-Fi may use one of the channels in an unlicensed band.

With the explosion of home automation, so-called "smart devices" within the home, mobile devices, and the like, an increasing number of devices are communicating via Wi-Fi networks. Additionally, the volume of data being delivered over these Wi-Fi networks is increasing as well. Streaming music and streaming video services consume significant bandwidth to provide reliable, continuous data content to a device. As a result of the increased number of devices and of the increased volume of data, the 2.4 GHz and 5 GHz bands are growing increasingly congested.

Recently, many countries have taken steps to open up an additional radio frequency spectrum for use by unlicensed Wi-Fi devices. The new frequency spectrum is in the 6 GHz range. The 6 GHz frequency band, however, was previously reserved for licensed wireless communication. Many existing licensees have wireless towers transmitting within the 6 GHz band at reserved frequencies. New wireless devices must be configured to avoid communicating via unlicensed Wi-Fi communications at the same frequency as existing licensed wireless communications.

Licenses within the 6 GHz frequency band are limited both by geography and by altitude. A licensee typically installs transmitters and receivers having antennas configured to transmit focused radio signals over a distance of several miles. Additionally, the transmitters and receivers are commonly placed on hills or on the roofs of tall buildings to provide a path of transmission between the transmitter and receiver. The focused radio signals may not be detectable within valleys, adjacent hills, or even at ground level next to a building on which a transmitter is located. Further, a licensee may broadcast in one city and not in another. The licensee may even broadcast in just one segment of a city, for example, along a transportation corridor within the city. In order for unlicensed Wi-Fi communication to coexist with the licensed communication, the unlicensed devices must not interfere with the licensed transmitters.

One type of unlicensed device that will begin using the 6 GHz frequency band are wireless access points. Access points are commonly used within buildings to improve quality of service for Wi-Fi communications within the building. A commercial building may require multiple access points spaced apart on each floor to ensure a strong wireless signal is available throughout the floor. A residential building may include multiple access points spaced apart on one floor, such as on opposite ends of a house; separate access points on different floors within the house; or a combination thereof. In order for the wireless access points to utilize the 6 GHz frequency band, they must be positioned a minimum distance and altitude from the licensed band such that the wireless access point does not interfere with the licensed users of that band.

Thus, it would be desirable for an access point to be able to accurately identify its current location and altitude to determine the presence of licensed transmitters within that location.

SUMMARY OF THE INVENTION

In accordance with one aspect of the invention, a system and method are provided that allow for an access point operating without a license in the 6 GHz frequency band to accurately identify its current location and altitude. The access point is then able to determine the presence of licensed transmitters in proximity with the identified location and altitude. The access points are provided to improve the quality of service for Wi-Fi communication. An installer will position the access points within a building to provide suitable coverage of the space and obtain a desired quality of service. Because multiple devices are often installed together, it is desirable to keep the cost per device low. In addition, there has not previously been a need for each device to have knowledge of a current location for the device. As a result, the access points commonly do not include circuitry, such as a global positioning circuit, which could provide information on the location of the access point. Thus, the access point needs to obtain information about its location via another method.

Each access point periodically generates a beacon frame which is broadcast to devices within range of the access point. The access point inserts a request for location information within the beacon frame prior to broadcast. Any client device capable of obtaining its location and altitude and which receives the beacon frame may choose to provide its location and altitude information to the access point. It is noted that location information may include coordinates of a client device, altitude of the client device, or a combination thereof. For convenience, when device location information is referred to herein, the device location information may include coordinate information, altitude information, or a combination thereof.

According to one aspect of the invention, the client device may be configured to grant permission to access points to read the device location information. This may be a device-wide setting or, optionally, an application may be executing on the client device which is compatible with the access point. The application may grant permission to the access point to obtain location information for the device. The client device is a mobile device, such as a mobile phone, a tablet computer, a laptop computer or the like, and the client device includes knowledge of its present location. The client device may include a global positioning circuit and be in communication with satellites to obtain its present location. Optionally, the client device may obtain its location from an application executing on the device, from data stored on the device, or from a Media Access Control (MAC) address assigned to the device. Each client device then broadcasts its location data back to the access point in response to the request. The access point access point uses the location information gathered from client devices to determine its own location.

Having determined its own location, the access point uses the location information to determine the presence of licensed transmitters in proximity to that location. The access point communicates with a central database containing information on registered licenses within the 6 GHz communication band at the location. The access point then selects and operated in one or more communication channels within the 6 GHz band that do not conflict with any licensed users in the area. The access point is then able to facilitate Wi-Fi communication between devices over the selected channel.

According to one embodiment of the invention, a method for automatic frequency control by an access point includes generating a first data frame at the access point, where the first data frame includes a request for location information. At least one client transmits location data to the access point in response to the at least one client receiving the first data frame, and the access point stores location data for the access point in memory as a function of the location data received from the at least one client. The access point communicates to a remote server via an external network, where the remote server is configured to store a database including registered location information. The registered location information defines a location of at least one licensed frequency band. The access point receives at least one available communication channel from the remote server, where the at communication channels provided from the remote server are not in use by the at least one licensed frequency band. The access point selects a communication channel from the at least one available communication channels for transmission of data to the at least one client.

According to another embodiment of the invention, a method of identifying location information of an access point includes generating a first data frame at the access point, where the first data frame includes a request for location information. The first data frame is transmitted from the access point at a periodic interval and received by at least one client device proximate the access point. The at least one client device includes location data defining a present location for the at least one client device, and the at least one client generates a responsive data frame including the location data for the at least one client. The responsive data frame is transmitted from the at least one client to the access point. Location data for the access point is set as a function of the location data received in the responsive data frame from the at least one client.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which:

FIG. 9 is a partial block diagram of a beacon response frame utilized according to one embodiment of the invention;

FIG. 10 is an exemplary table of global positioning data which may be provided as location information to an access point.

DETAILED DESCRIPTION OF THE PREFERRED EMBODIMENTS

Figure 1:
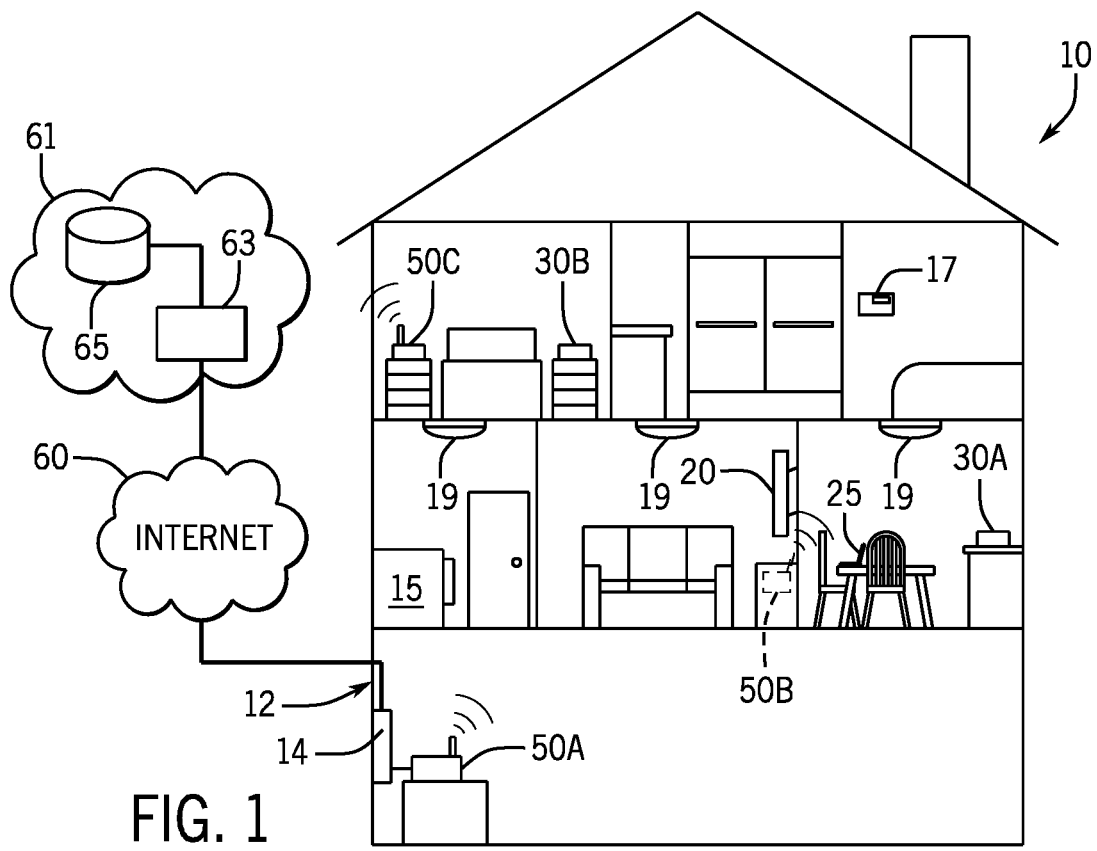
FIG. 1 schematically illustrates an exemplary environment incorporating one embodiment of the invention.

Referring now to FIG. 1, an exemplary residential environment 10 incorporating access points 50 operating in the 6 GHz band and utilizing Automatic Frequency Control is illustrated. The illustrated environment 10 is a residential dwelling, it being understood that the concepts discussed with respect to environment apply at least generally equally to any number of commercial or industrial environments. The illustrated residential environment 10 illustrates a portion of the rooms that may be found in a two-story home with a basement. An Internet Service Provider (ISP) runs a cable to an entry point 12 in the basement and, in turn, to a junction box 14. The cabled connection connects the home to the Internet 60 via the ISP. A first access point 50A is provided in the basement proximate the junction box 14 and in some embodiments may be included within the junction box. A cabled connection is run from the entry point 12 to the first access point 50A. According to the illustrated embodiment, three access points are provided. The first access point 50A is in the basement. A second access point 50B is on the first floor, and a third access point 50C is on the second floor. The access points 50A-50C work together to provide a mesh network for Wi-Fi connectivity within the house 10. Depending on the size of the house, a single access point 50 may be provided, or still other numbers of access points may be provided to deliver acceptable Wi-Fi performance within the house.

As further illustrated in FIG. 1, multiple "smart-devices" may need to communicate via the Wi-Fi network established by the access points. A washing machine 15, a thermostat 17, lighting 19, a television 20, a laptop computer 25 and multiple mobile phones 30A, 30B are illustrated as exemplary devices communicating via the Wi-Fi network. For purposes of discussion herein, each mobile phone 30 will be referred to as a client, or client device, in communication with the access points 50. Each mobile phone 30 includes a global positioning circuit and is able to obtain location information for the present location of the device. This discussion is not intended to be limiting. It is contemplated that other smart-devices may also include location information, either via a global positioning circuit or via other mechanisms as will be discussed in more detail below. Each device communicating on the Wi-Fi network may provide location information to the access points 50.

Figure 2:
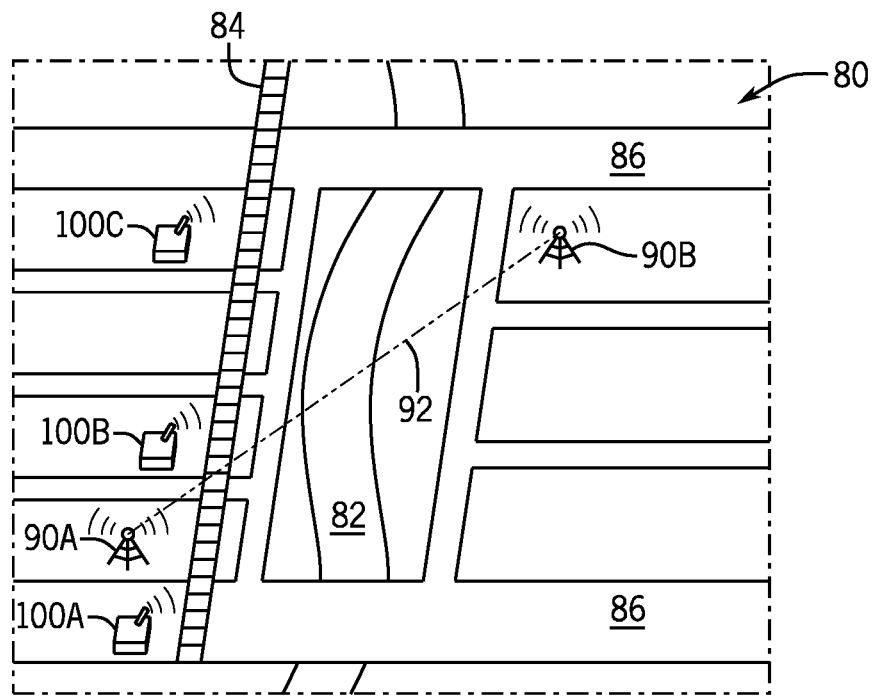
FIG. 2 schematically illustrates another exemplary environment incorporating one embodiment of the invention.

With reference next to FIG. 2, another exemplary environment 80 illustrates a segment of a city. The illustrated city segment 80 includes a river 82, a train track 84, and multiple streets 86. A licensed user has installed a pair of antennas 90A, 90B transmitting data over a licensed channel on the 6 GHz band. A transmission path 92 extends between a first antenna 90A and a second antenna 90B. The transmission path may be located at street level, if, for example, there is no interference across the river. Optionally, the transmission path may be located several hundred feet in the air if high-rise buildings exist on each side of the river 82 and the antennas 90 are each mounted on one of the buildings. When a licensed user applies for a licensed channel within the 6 GHz band, a frequency band is selected and the location and height of the antennas 90 are provided. This data is stored with an Automatic Frequency Coordination (AFC) Service 61 (see also FIG. 1). The AFC Service 61 includes a computation engine 63 and a central database 65. The AFC Service 61 is publicly available via the Internet 60 to provide notice to other users of the location and frequency of licensed channels. Although illustrated with just one pair of antennas 90, it is contemplated that a licensee may install any number of antennas and provide licensed transmissions across a wider geographic area. The number and locations of each antenna would be recorded within the central database 65 of the AFC Service 61.

FIG. 2 further illustrates a number of unlicensed users 100 within the same segment of the city 80. A first unlicensed access point 100A and a second unlicensed access point 100B are each located proximate the first licensed antenna 90A. A third unlicensed access point 100C is located far enough from the transmission path 92 such that the third unlicensed access point 100C can not interfere with the licensed transmissions. As will be discussed in more detail below, each of the access points 100 will be able to identify its present location and transmit its location to the AFC Service 61. The computation engine 63 for the AFC Service, in turn, identifies any licensed users of the 6 GHz frequency band at the identified location. The AFC Service 61 sends a response to the access point 100 with acceptable channels in which the access point may communicate, where the acceptable channels avoid interference with any licensed users. Each access point 100 may then select from the acceptable channels provided by the AFC Service 61. In this manner, the first and second access points 100A, 100B receive a list of communication channels which avoid interfering with the licensed antennas 90 and restrict themselves from transmitting at a frequency that would interfere with the licensed communication. The third access point 100C would similarly transmit its location to the AFC Service 61. Because the third access point 100C is out of range of the transmission path 92, the AFC Service may include the same frequency band as the licensed communication occurring over transmission path 92 in the list of acceptable channels at which the third access point 100C may communicate.

Figure 3:
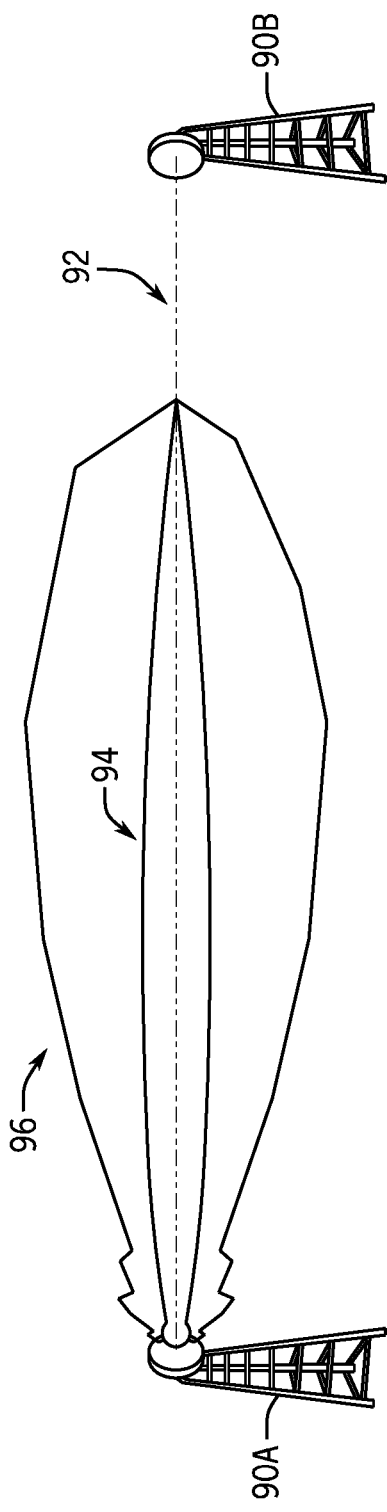
FIG. 3 is a schematic representation of a focused radio transmitter and receiver using a licensed frequency channel.

With reference also to FIG. 3, the transmission path 92 from FIG. 2 is a focused radio frequency (RF) emission. A first band 94 illustrates a narrowly focused RF emission from a high gain transmitter. A second band 96 illustrates a slightly wider, but still focused RF emission from a medium gain transmitter. The direction and width of RF emission as well as the frequency band of the channel may all define a protection zone in which no other device may transmit. The location and altitude of the antennas 90 as well as the frequency band at which the antennas transmit are each stored in the central database 65 of the AFC Service 61 as a public record of licensed users of the 6 GHz band.

Figure 4:
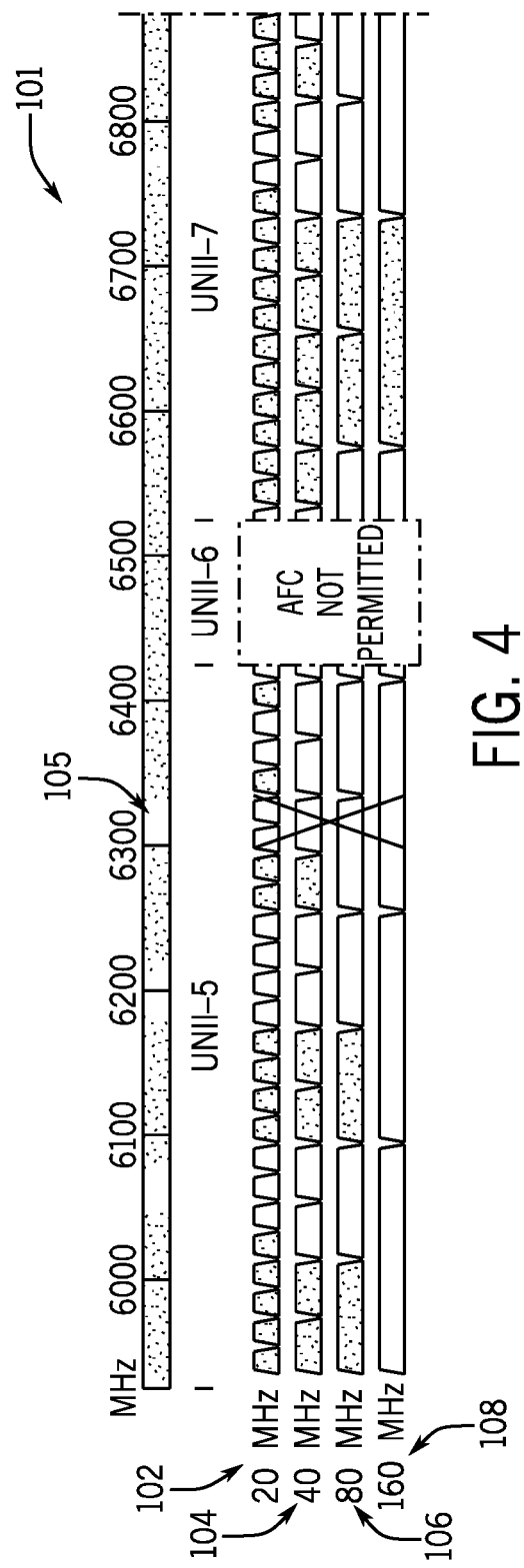
FIG. 4 is a graphical representation of channels available in the 6 GHz frequency band.

With reference also to FIG. 4, a schematic representation 101 of the 6 GHz band is presented. In the United States, a frequency band between 6425 Megahertz (MHz) and 6525 MHz is restricted from unlicensed use. This is the band labelled as "AFC not Permitted". The remaining frequency band between 5925 MHz and 6875 MHz makes up the 6 GHz band. According to the illustrated embodiment, there is one licensed user at the location in the exemplary segment of the city 80 from FIG. 2. This licensed user has a license to use a 30 MHz frequency band 105 between 6300 MHz and 6330 MHz. This frequency band is referred to herein as a licensed frequency band, and any unlicensed user within range of one of the antennas 90 for this licensed user must avoid transmitting unlicensed data within this licensed frequency band.

FIG. 4 further illustrates potential communication channels for unlicensed data. An access point may be configured to transmit on a 20 MHz channel 102, a 40 MHz channel 104, an 80 MHz channel 106, a 160 MHz channel 108, or a combination thereof. The width of the communication channel (102, 104, 106, or 108) dictates how much data may be transmitted and at what speed the data may be transmitted within each channel Selection of a particular bandwidth for a communication channel (102, 104, 106, or 108) will depend on configuration of the access point and on application requirements. However, the number of communication channels available at each bandwidth varies, as illustrated in FIG. 4, and, in any event, the access point cannot select a communication channel that overlaps the licensed frequency band when the access point is located within the transmission path of the licensed communication channel.

Figure 5:
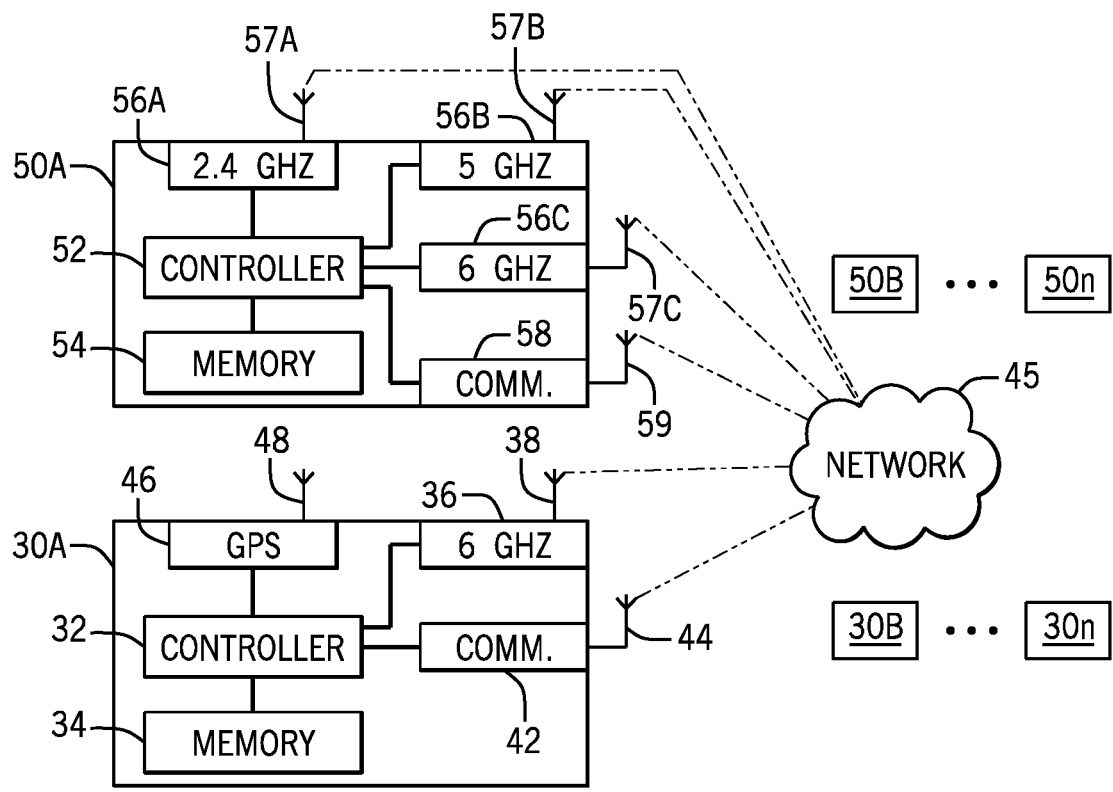
FIG. 5 is a block diagram representation of an exemplary Wi-Fi network incorporating one embodiment of the invention.

Turning next to FIG. 5, the invention will be discussed with an exemplary access point 50 and an exemplary client device 30 illustrated. As shown, it is contemplated that any number (e.g., "n") access points or client devices may communicate over a network 45. For ease of illustration an exemplary first access point 50A and an exemplary first client device 30A are each shown in more detail.

The first access point 50A includes a controller 52 and memory 54. It is contemplated that the controller 52 may include a single processor or multiple processors. The controller 52 further includes control circuitry such as digital logic, buffers, communication buses, and the like as would be understood in the art. The memory 54 may be a single device or multiple devices. The memory 54 includes a non-transient medium in which a program executable for controlling the first access point 50A is stored. The controller 52 is configured to execute the program to control the access point, including to carry out steps according to the present invention. The memory 54 may further include flash memory holding firmware configured to provide low-level control for hardware of the first access point 50A. It is further contemplated that the controller 52 may include dedicated processors for specific functions of the first access point 50A, such as selecting a frequency band and/or frequency channel for communication or for security of transmitted data, such as through integrated cryptographic keys of a Trusted Platform Module (TPM) known according to ISO/IEC 11889.

The first access point 50A may further include multiple wireless network circuits 56, labelled 56A, 56B, and 56C by way of example. Each network circuit 56 can be configured for electronic communication in a given wireless Local Area Network (LAN) band, such as according to the IEEE 802.11 family of standards. For example, in one aspect, the access point 50 can include a first network circuit 56A configured for communication in a 2.4 GHz radio band ("2 GHz"); a second network circuit 56B configured for communication in a 5 GHz radio band ("5 GHz"); and a third network circuit 56C configured for communication in a 6 GHz radio band ("6 GHz"). It is further contemplated that the access point 50 may have multiple network circuits 56 for each radio band. While having various network circuits 56 in different bands, such as 2.4 GHz, 5 GHz, or 6 GHz, can advantageously accommodate different types of clients 30, having multiple network circuits in a common band, such as two network circuits in the 6 GHz band, can advantageously accommodate communication with a greater volume of clients 30 in a given band.

Each network circuit 56 can comprise circuitry utilizing one or more antennas 57 to enable wireless communication in a given frequency band. In addition, each network circuit 56 can selectively communicate with a client 30 on a given channel of the frequency band. For example, the first network circuit 56A can selectively communicate on any of fourteen Wi-Fi channels designated in the 2.4 GHz range, each channel being spaced 5 MHz apart from one another, except for a 12 MHz space before channel fourteen, according to 802.11b/g/n/ax. Similarly, the second network circuit 56B can selectively communicate on a given Wi-Fi channel designated in the 5 GHz range, which channels could be spaced apart by 10, 20, 40, 80 or 160 MHz. The third network circuit 56C can selectively communicate on a given Wi-Fi channel designated in the 6 GHz range, which channels could also be spaced apart by 20, 40, 80 or 160 MHz. All of these values are exemplary and not intended to be limiting. Accordingly, in addition to simultaneous communication with clients 30 on a given channel of a network circuit 56 within a given frequency band as described herein, the access point 50 can also communicate simultaneously with different clients 30 on different channels through multiple network circuits 56 configured to operate in the same frequency band.

Still referring to FIG. 5, the access point 50 can further include additional communication circuitry 58. The additional communication circuitry 58 may include a network switch, one or more Local Area Network (LAN) ports for communication on a wired network, a network processing unit (NPU), a removable memory port, configured to receive a memory card or Universal Serial Bus (USB) memory device, and/or a security device. The network switch can connect clients 30 on a network, whether wirelessly through network circuits 56 or wired through LAN ports, such as by using packet switching to receive, process and forward data to destination devices.

The first client device 30A includes a controller 32 and memory 34. It is contemplated that the controller 32 may include a single processor or multiple processors. The controller 32 further includes control circuitry such as digital logic, buffers, communication buses, and the like as would be understood in the art. The memory 34 may be a single device or multiple devices. The memory 34 includes a non-transient medium in which a program executable for controlling the first client device 30A is stored. The controller 32 is configured to execute the program to control the client device. The memory 34 may further include flash memory holding firmware configured to provide low-level control for hardware of the first client device 30A. It is further contemplated that the controller 32 may include dedicated processors for specific functions of the first client device 30A, such as selecting a frequency band and/or frequency channel for communication, obtaining position information from a global positioning circuit 46, or for security of transmitted data.

The first client device 30A further includes a global positioning circuit 46 which, according to the illustrated embodiment, is configured to use the Global Positioning System (GPS) to obtain location data for the client device. The first client device 30A also includes a network circuit 36 configured for communication in the 6 GHz band, and additional communication circuitry 42. It is contemplated that the additional communication circuitry 58 may include additional network circuits for other frequency bands, a removable memory port, configured to receive a memory card or Universal Serial Bus (USB) memory device, and/or a security device.

Figure 11:
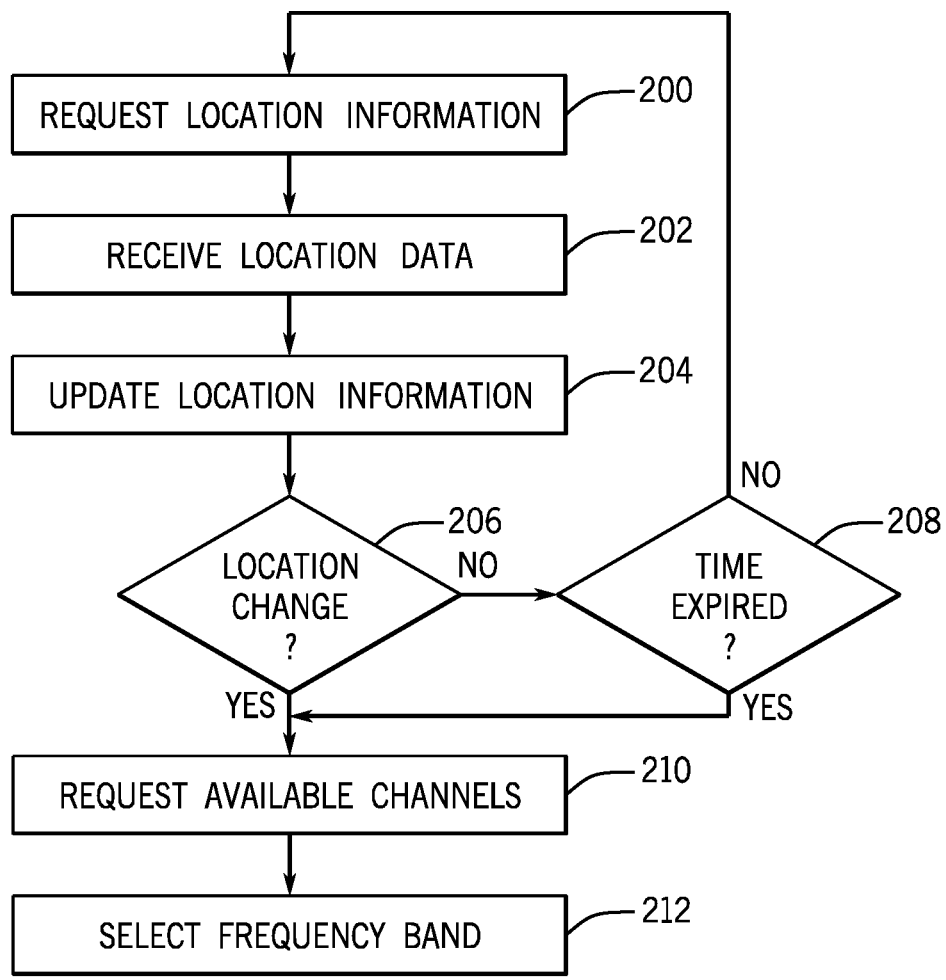
FIG. 11 is a flow diagram illustrating the steps for automatically selecting a frequency in the access point according to one embodiment of the invention.

In operation, the controller 52 of access point 50 can execute a program stored in the memory 54 to control operation of the access point 50 to automatically identify a frequency channel within the 6 GHz band at which the access point 50 may communicate in an unlicensed manner without interfering with any licensed devices located near the access point 50. With reference to FIG. 11, the access point 50 initially requests location information, as shown in step 200, and, in turn, receives location data from at least one client device 30 within proximity of the access point, as shown in step 202.

Figure 6:
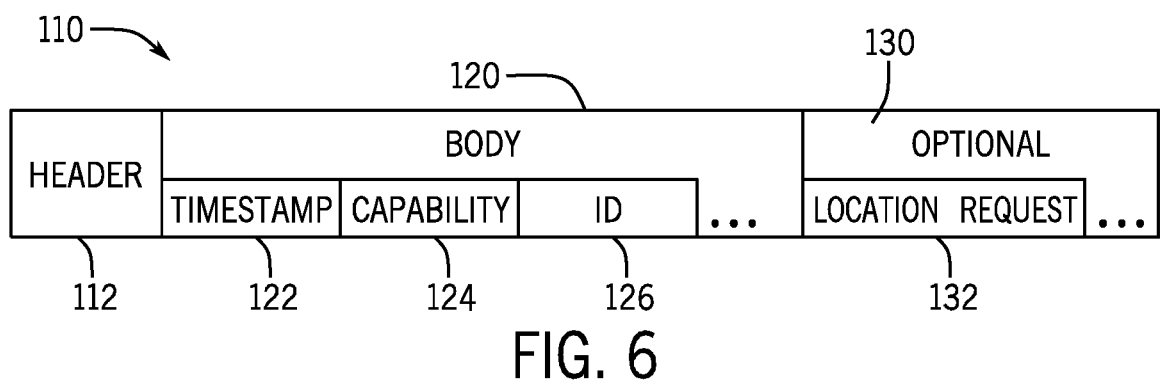
FIG. 6 is a partial block diagram of a beacon frame utilized according to one embodiment of the invention.
Figure 8:
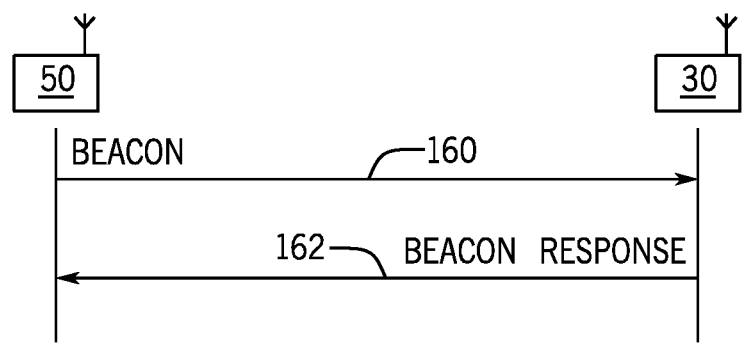
FIG. 8 is a timing diagram illustrating a beacon frame and response.

Turning to FIGS. 6 and 8, one method of obtaining location data is illustrated. The access point 50 is configured to generate a beacon frame 110. The beacon frame 110 includes a header 112 and body 120 where the data provided in the header and body are generally defined by the IEEE 802.11 specification. The body 120 includes, for example, a timestamp 122, corresponding to the present time on the access point 50, the capabilities 124 of the access point, and an identifier 126 for the access point. The beacon frame 110 is used by an access point to announce its availability to client devices 30 within its broadcast range and to also describe its capabilities, such as which frequency band or bands on which it may communicate, what frequency channels are available within each frequency band, connection speed, what security capabilities are available on the access point, and the like.

In addition to the header 112 and body 120, the beacon frame 110 may include additional, or optional, data 130 which is appended to the beacon frame 110 by the manufacturer of the access point 50. Within this optional data 130, the access point inserts a location request 132. The location request is a read request transmitted from the access point 50 to the client device 30, requesting that the client device 30 provide its current location to the access point. As shown in FIG. 8, a client device 30 may be configured to respond directly to a beacon frame 110. At step 160, the beacon frame is broadcast, and at step 162 a beacon response frame is transmitted back from the client device 30 to the access point 50. In some embodiments of the invention, a manufacturer of the access point 50 may also have an application stored in the memory 34 and configured to execute on the controller 32 of the client device 30. For example, a manufacturer of the access point 50 may provide a setup application for a consumer to facilitate installation and commissioning of the access point. In the exemplary residential environment of FIG. 1, a homeowner may purchase multiple access points 50 for establishing a robust Wi-Fi network within their home. The manufacturer of the access point 50 commonly provides an application that may be downloaded to a mobile phone, tablet computer, laptop computer, or the like, that is able to detect newly installed access points 50. The application may setup configuration parameters on each access point consistently to facilitate communication between access points. The application may also provide diagnostic tools for the home owner to detect signal strength, frequency bands or channels being utilized by an access point, communication speed and the like. The application may request permission by the user during installation of the application to access the location information on the mobile device. Thus, when the beacon frame 110 is transmitted from the access point 50, the mobile device is ready to generate a beacon response with the current location of the mobile device and provide the location information to the access point.

Figure 7:
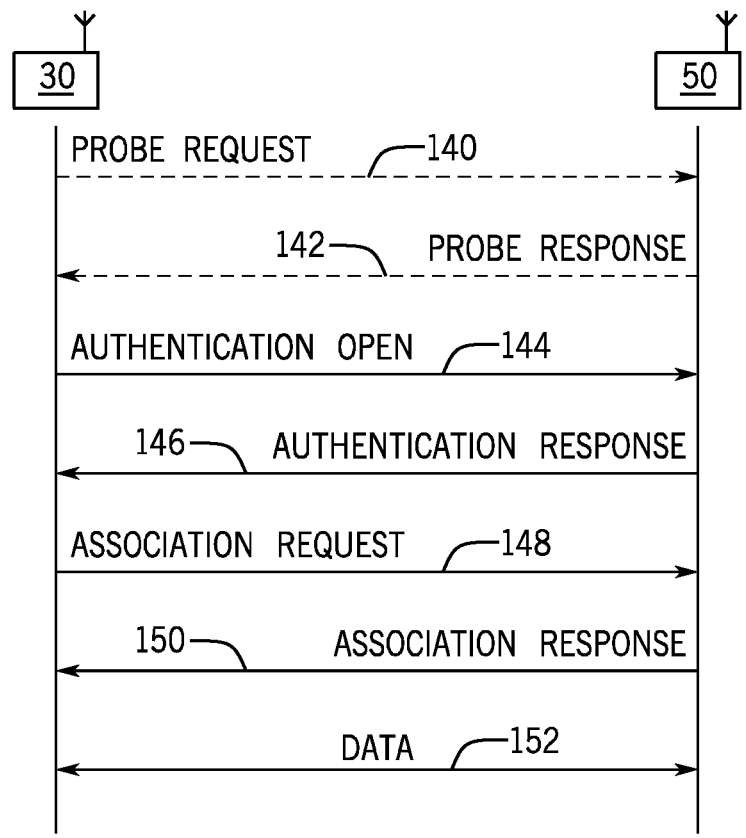
FIG. 7 is a timing diagram illustrating data frames required to establish a Wi-Fi connection between a client and an access point incorporating one embodiment of the present invention.

In other embodiments, the access point 50 may be communicating with mobile devices or other client devices that do not have a corresponding application from the manufacturer of the access point 50 installed. It is contemplated that client devices 30 without an application executing on the device may utilize any one of other data frames that are transmitted between the client device 30 and the access point 50 in which to provide location data. Turning next to FIG. 7, a typical series of data frames for establishing communication on an access point 50 by a client device 30 are illustrated. A client device 30 may either passively or actively scan for active wireless networks within range of the device. When passively scanning, the client device 30 monitors the beacon frames generated by each access point 50 to learn the capabilities of the access point.

Optionally, a client device 30 may actively scan for access points 50. As shown at steps 140 and 142, a client device 30 may actively send a probe request to the access point 50 to learn the capabilities of the access point. The active scan may occur, for example, when a client device 30 powers up rather than waiting for each access point 50 to transmit a beacon frame. The access point 50 responds by transmitting a probe response in which it provides its capabilities. It is contemplated that the access point may include a request for location data appended in optional data of a probe response in a manner similar to that discussed above with respect to the beacon frame. Similarly, the request for location data may be appended in the authentication response 146 or association response 150 discussed in more detail below. The client device 30, in turn, provides the requested location data in any subsequent data frame transmitted back to the access point 50 after receiving the location request.

Whether the client device 30 is passively or actively detecting available wireless networks, the client device 30 will typically receive a request for location information prior to authentication and association of the client device 30 with the access point 50. Once the client device 30 identifies an access point 50 with common capabilities (i.e., a common frequency band, connection speed, security level, etc . . . ), the client device 30 must establish a connection with the access point 50. Establishing this connection is a two-step process of authentication and association. As shown in steps 144-150 of FIG. 7, the client device 30 generates an authentication open frame to which the access point 50 provides an authentication response frame. Once authenticated, the client device 30 generates an association request frame to which the access point provides an association response frame. Once the client device 30 is associated with the access point 50 bidirectional data flow may occur between the client device 30 and the access point 50 as shown at step 152.

The client device 30 having received a request for location information from the access point 50 in either a beacon frame or a probe response frame, may append its current location data in optional data of an authentication open frame or an association request frame. With reference also to FIG. 9, a general management frame 180 is illustrated. The general management frame 180 may be the authentication open frame or the association request frame. Each management frame 180 includes a header 182 and body 184 as defined in the IEEE 802.11 specification. Each management frame 180 may further have optional data 186 appended to the frame by the manufacturer of the client device 30. As shown in FIG. 9, the client device 30 may embed its location data 188 in the optional data for either the authentication open frame or the association request frame. It is contemplated that the request for location data 132 transmitted from the access point 50 includes an identifier for the request. A response to the request for location data 132 may similarly include the identifier such that the access point 50 recognizes the location data 188 as being embedded in the data frame in response to the original request for location data.

According to another aspect of the invention, the access point may request that location data be encrypted prior to transmission from the client device 30 to the access point 50. The encryption may prevent false location data from being provided to an access point in an attempt to compromise the quality of service of licensed communications. When a client device 30 includes an application from the manufacturer of the access point 50 executing on the client device 30, encryption protocols may be configured within the application such that encrypted communication may occur between the client device 30 and the access point 50. In such an application, the client device 30 and the access point 50 may first establish bidirectional data transfer via authentication and association and subsequently transmit location information in an encrypted data packet according to the security protocols established in the application executing on the client device 30.

Alternately, the access point 50 may also insert a desired security level, a public encryption key, or any other data required to establish encrypted communication between a client device 30 and the access point in the optional data of the beacon frame 110. The client device 30 may utilize this information and again first establish bidirectional data transfer with the access point via authentication and association. After establishing a communication channel between the client device 30 and the access point 50, location information is transmitted in an encrypted data packet from the client device 30 to the access point 50 according to the security protocols established in the additional data inserted in the beacon frame 110. The access point 50 may then decrypt the secure location information and use the decrypted data when determining its own position.

According to still another aspect of the invention, the access point may be configured to utilize Management Frame Protection (MFP). Unlike data frames, which may be encrypted, management frames are typically broadcast without encryption to permit all clients to receive and understand the data within the management frame. MFP, configured, for example, under the IEEE 802.11w standard, provides for an enhanced level of security for transmission of management frames. The location request 132 and subsequent transmission of location data may similarly be embedded in optional data for the protected management frames.

Client device 30 may determine its own location data by a number of different methods. According to a first method, the client device 30 includes a global positioning circuit 46 in communication with global positioning satellites to obtain its present location. With reference to FIG. 10, an exemplary table of position location data is illustrated. The location data may be time-stamped and include a latitude, longitude, and altitude of the device. The mobile device 30 may be moving, for example, in one direction and gaining altitude. The access point 50 receives the different locations from the mobile device as it travels through the broadcast area of the access point. Optionally, the client device may obtain its location from an application executing on the device, from data stored on the device, or from a Media Access Control (MAC) address assigned to the device. A web browser, for example, may have requested a user input location data when requesting directions, shopping online, searching for services, or the like. The web browser may store the location data entered and provide the stored location data to a request for location data from the access point 50.

According to still another aspect of the invention, the access point 50 may include an application stored in memory 54 of the access point 50 and configured to execute during commissioning of the access point 50. This application may, for example, be configured to communicate via the Internet 60 with a manufacturer of the access point 50 to check for updates to firmware or be configured to automatically configure at least a portion of the operating parameters for the access point 50. During execution of this commissioning application, the access point 50 may obtain initial values for the location and altitude data of the access point 50 via the Internet communications. Future communications with client devices may refine and/or override the initial location data.

According to yet another aspect of the invention, the access point 50 may be installed as part of a mesh system. In a mesh system, one access point 50 is typically configured as the primary access point for the system. The primary access point may be connected to a service provider and be in communication via either a wired or wireless connection to each of the other access points within the mesh system. The primary access point may include a global positioning circuit and be configured to obtain location and altitude information from the Global Positioning System. The primary access point may transmit this location and altitude information to each of the other access points 50 present in the mesh system as an initial value of the location for each access point 50. Future communications with client devices may refine and/or override the initial location data.

Referring again to FIG. 11, after the access point 50 has obtained location data 188 from a client device 30, the access point 50 updates its own location information, as shown in step 204. According to one aspect of the invention, the access point 50 stores its present location in non-volatile memory 54 such that it may retain knowledge of its position through power being lost. When new location data is received, the access point 50 may utilize the new location data to improve knowledge of its current location. If, for example, multiple client devices 30 are present within range of the access point 50, the access point may average the location data from each of the client devices 30 to obtain its present location. Optionally, the access point 50 may include a logic circuit within the controller 52 or may include a series of instructions executing on the controller 52 to detect a signal strength received from a client device 30. The access point 50 may provide weighting to location data received according to the signal strength. For client devices with a greater signal strength, the access point 50 may determine that the client device 30 is closer to the access point than another client device with a weaker signal strength. The access point 50 may provide a weighted average of the locations of each client such that it gives a greater weight to the location data from a client device 30 having a stronger signal strength than a client device with a weaker signal strength.

According to still another aspect of the invention, the access point 50 may store multiple values of location data from a single client device 30. With reference again to the example in FIG. 10, as a client device 30 moves through the broadcast area of the access point, multiple values of location data may be received. The access point 50 may utilize the range of data, varying signal strength as the client device traverses the broadcast range, and the like to obtain a better estimate of the access point's location with respect to the client device.

According to still another aspect of the invention, the access point 50 may be mobile. An access point 50 may be mounted, for example, on a car, bus, train, boat, or other method of transportation. As shown in step 206 of FIG. 11, the access point 50 may monitor its present location and compare it to a prior stored value of location. When the new location, received from a client device 30, varies greater than a predefined value, the access point 50 determines that it has changed location. When an access point 50 changes location, it must check for licensed users at the new location as shown in step 210. If the new location, received from a client device 30, is less than the predefined value, the access point 50 determines that it is at the same location and may update its present location in the manner described above.

When an access point 50 obtains initial location data 188 from a client device 30 or via any of the other methods of obtaining initial location data described above, the access point 50 determines that the location change is greater than the predefined value and requires the access point 50 to request data on licensed users proximate to the access point 50. The access point 50 communicates with a remote server via an external network, such as the Internet 60 (see FIG. 1) to access the database 65 storing information on licensed users of the 6 GHz band. The remote server illustrated in FIG. 1 is the AFC Service 61. The access point 50 communicates with the computation engine 63 of the AFC Service 61 to request available communication channels at its present location. It is contemplated that the AFC Service 61 is available at a known Uniform Resource Locator (URL), MAC address, or the like maintained, for example, by the Federal Communications Commission (FCC). The access point 50 has the URL or other identifying location stored in memory 54 and is configured to communicate with the AFC Service 61.

As previously discussed, the access point 50 requests that the AFC Service 61 provide at least one available communication channel for use by the access point 50 at its present location. The computation engine 63 of the AFC Service interrogates the central database 65 to identify existing location and altitude information of any licensed user at the location of the access point 50. The computation engine 63 eliminates any communication channel which conflicts with a licensed frequency range. The computation engine 63 then compiles a list of available communication channels from the remaining available communication channels which do not conflict with a licensed frequency range at the identified location. The computation engine 63 may return all of the available channels or, optionally, may receive a parameter setting from the access point 50 identifying a maximum number of available communication channels to include in the list. The computation engine 63 transmits the list, including at least one available communication channel, and preferably multiple available communication channels back to the access point 50.

Information on licensed users is updated by a regulator or agency, such as the FCC, in charge of managing licensed communications. A regulator provides updated information in the database 65 for the AFC Service 61 as new licenses are purchased or existing licenses expire. As a result, the licensed users of the 6 GHz frequency band near an access point may change over time. The access point, therefore, may also have a timer that causes the access point 50 to periodically check the database 65 of the AFC Service 61 for changes in the licensed users. At step 208 in FIG. 11, the access point 100 checks if the timer has expired. If the timer has expired, then the access point 50 will again request available communication channels at its present location. The AFC Service 61 presents a new list of available communication channels at the location of the access point 100. The list of available communication channels may be identical to the original list or may include a new available channel consistent with the updated information in the database 65. This timer may be set, for example, to 24 hours such that the access point 50 will daily receive a list of available communication channels at its location. In this manner, the access point 50 is able to obtain information on licensed users either when its location changes or if the list of licensed users is updated.

At step 212 of FIG. 11, the access point 50 selects an available channel within the 6 GHz band at which it may communicate with the client 30. If there are no licensed users of the 6 GHz band within the broadcast area of the access point 50, the access point may select any of the channels in the 20 MHz band 102, 40 MHz band 104, 80 MHz band 106, or 160 MHz band of the 6 GHz spectrum, as shown in FIG. 4. If, however, a licensed user is present within the broadcast area for an access point 50, the access point selects a communication channel within the 6 GHz band that does not conflict with the licensed user. Thus, the access point 50 is able to automatically select communication channels within the 6 GHz band that do not interfere with licensed users.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

It should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

What is claimed is:

1. A method for automatic frequency control by an access point, comprising the steps of:
   generating a first data frame at the access point, wherein the first data frame includes a request for location information;
   receiving location data, transmitted from at least one client, at the access point, the location data being transmitted in response to the at least one client receiving the first data frame;
   storing location data in memory for the access point as a function of the location data received from the at least one client;
   communicating from the access point to a remote server via an external network, wherein the remote server is configured to store a database including registered location information, and wherein the registered location information defines a location of at least one licensed frequency band;
   receiving at least one available communication channel from the remote server, the at least one available communication channel not in use by the at least one licensed frequency band; and
   selecting the at least one available communication channel for transmission of data to the at least one client.

2. The method of claim 1, wherein:
   the access point is configured to periodically communicate with the remote server to detect changes in the registered location information stored in the database,
   when the access point receives at least one new available communication channel, the access point selects a new available communication channel for transmission of data to the at least one client.

3. The method of claim 1, wherein the first data frame is a beacon frame and wherein the access point periodically generates the beacon frame and periodically sets the location data for the access point, the method further comprising the steps of:
   storing the location data for the access point as a present location;
   comparing the location data received from the at least one client at each periodic interval; and
   when a difference between the present location and the location data received from the at least one client exceeds a predefined threshold:
   setting a new location for the access point,
   communicating from the access point to the remote server to obtain at least one available communication channel at the new location, and
   selecting the at least one available communication channel at the new location by which the access point transmits data.

4. The method of claim 1, wherein:
   the first data frame is received by a plurality of clients,
   each of the plurality of clients is configured to transmit location data to the access point responsive to receiving the first data frame, and
   the step of setting location data for the access point further comprises setting the location data for the access point to an average value of the location data received at the access point from each of the plurality of clients.

5. The method of claim 1, wherein the at least one client is configured to transmit location data to the access point via a second data frame selected from one of an authentication open and an association request.

6. The method of claim 1, wherein the location data includes a latitude, a longitude, and an altitude.

7. The method of claim 1, wherein the at least one client is configured to access a global positioning system, and wherein the location data transmitted from the at least one client to the access point is a current location of the at least one client obtained from the global positioning system.

8. The method of claim 1, wherein the client is a computing device that does not access a global positioning system, and wherein the location data is obtained from one of data stored in memory on the computing device; an application executing on the computing device, and an Internet Protocol (IP) address assigned to the client.

9. The method of claim 1, wherein the first data frame further includes a request for authorization to access the location information from the at least one client.

10. The method of claim 9, wherein the at least one client includes an application executing on the at least one client to detect the request for authorization and, when the application detects the request for authorization, the application determines a permission level on the at least one client prior to transmitting the location data to the access point.

11. The method of claim 9, further comprising the steps of:
establishing an encryption protocol between the at least one client device and the access point;
encrypting the location data on the at least one client prior to transmitting the location data to the access point; and
decrypting the location data at the access point.

12. A method of identifying location information of an access point, comprising the steps of:
generating a first data frame at the access point, wherein the first data frame includes a request for location information;
transmitting the first data frame from the access point at a periodic interval;
receiving a responsive data frame from at least one client device proximate the access point, wherein:
the at least one client is a computing device that does not access a global positioning system,
the responsive data frame is generated in the at least one client,
the responsive data frame includes location data defining a present location for the at least one client, and
the responsive data frame is transmitted from the at least one client to the access point as a result of the at least one client receiving the first data frame from the access point; and
setting location data for the access point as a function of the location data received in the responsive data frame from the at least one client, wherein the step of generating the responsive data frame in the at least one client further comprises the steps of:
(a) obtaining location data on the at least one client from one of data stored in memory on the computing device; an application executing on the computing device, and an Internet Protocol (IP) address assigned to the at least one client, and
(b) inserting the location data obtained in step (a) in the responsive data frame.

13. A method of identifying location information of an access point, comprising the steps of:
generating a first data frame at the access point, wherein the first data frame includes a request for location information and a request for authorization to access the location information from at least one client;
transmitting the first data frame from the access point at a periodic interval;
receiving a responsive data frame from the at least one client device proximate the access point, wherein:
the responsive data frame is generated in the at least one client,
the responsive data frame includes location data defining a present location for the at least one client, and
the responsive data frame is transmitted from the at least one client to the access point as a result of the at least one client receiving the first data frame from the access point; and
setting location data for the access point as a function of the location data received in the responsive data frame from the at least one client, wherein the at least one client includes an application executing on the at least one client to detect the request for authorization and when the application detects the request for authorization the application determines a permission level on the at least one client prior to generating the responsive data frame.

14. The method of claim 13, further comprising the steps of:
establishing an encryption protocol between the at least one client device and the access point;
encrypting the location data on the at least one client prior to inserting the location data in the responsive data frame; and
decrypting the location data at the access point after receiving the responsive data frame.

15. The method of claim 13, wherein:
the first data frame is received by a plurality of clients,
each of the plurality of clients is configured to generate the responsive data frame including location data for the corresponding client,
each of the plurality of clients is configured to transmit the responsive data frame to the access point, and
the step of setting location data for the access point further comprises setting the location data for the access point to an average value of the location data received from each of the plurality of clients at the access point.

16. The method of claim 13, wherein the responsive data frame is selected from one of an authentication open and an association request transmitted from the client to the access point.

17. The method of claim 13, wherein the location data includes a latitude, a longitude, and an altitude.

18. The method of claim 13, wherein the at least one client is in communication with a global positioning system, and wherein the step of generating the responsive data frame in the at least one client further comprises the steps of:
obtaining a current location of the at least one client from the global positioning system, and
inserting the current location in the responsive data frame as the location data.

* * * * *